United States Patent
Nagamoto et al.

(10) Patent No.: US 12,249,897 B2
(45) Date of Patent: Mar. 11, 2025

(54) MOTOR AND FAN DEVICE

(71) Applicant: MITSUBA Corporation, Gunma (JP)

(72) Inventors: Satoshi Nagamoto, Gunma (JP); Keiichi Hosoi, Gunma (JP)

(73) Assignee: MITSUBA Corporation, Gunma (JP)

( * ) Notice: Subject to any disclaimer, the term of this patent is extended or adjusted under 35 U.S.C. 154(b) by 308 days.

(21) Appl. No.: 18/089,528

(22) Filed: Dec. 27, 2022

(65) Prior Publication Data
US 2023/0299640 A1    Sep. 21, 2023

(30) Foreign Application Priority Data

Mar. 15, 2022 (JP) ................................ 2022-040302

(51) Int. Cl.
| | |
|---|---|
| H02K 9/06 | (2006.01) |
| H02K 3/46 | (2006.01) |
| H02K 5/04 | (2006.01) |
| H02K 11/33 | (2016.01) |

(52) U.S. Cl.
CPC .............. *H02K 9/06* (2013.01); *H02K 3/46* (2013.01); *H02K 5/04* (2013.01); *H02K 11/33* (2016.01)

(58) Field of Classification Search
CPC ........... H02K 5/225; H02K 5/04; H02K 9/06; H02K 3/46; H02K 5/1735; H02K 21/22; H02K 11/33
USPC .......................................................... 310/52
See application file for complete search history.

(56) References Cited

U.S. PATENT DOCUMENTS

| | | | | |
|---|---|---|---|---|
| 8,957,557 | B2 * | 2/2015 | Yamasaki | H02K 9/227 310/72 |
| 9,088,195 | B2 * | 7/2015 | Yamasaki | B62D 5/0406 |
| 9,271,422 | B2 * | 2/2016 | Yamasaki | H02K 5/10 |
| 9,521,775 | B2 * | 12/2016 | Yamasaki | H05K 7/14322 |
| 10,931,162 | B2 * | 2/2021 | Tsutsui | B62D 5/0403 |
| 11,025,129 | B2 * | 6/2021 | Fukunaga | H02K 5/16 |
| 2009/0146516 | A1 * | 6/2009 | Yano | H02K 5/10 310/152 |
| 2013/0334917 | A1 * | 12/2013 | Miyabara | H02K 11/33 310/71 |
| 2017/0214292 | A1 * | 7/2017 | Nagahama | H02K 3/522 |

(Continued)

FOREIGN PATENT DOCUMENTS

| | | |
|---|---|---|
| JP | 2010057345 | 3/2010 |
| JP | 2020122426 | 8/2020 |
| WO | WO-2021171832 A1 * | 9/2021 |

*Primary Examiner* — Alex W Mok
(74) *Attorney, Agent, or Firm* — JCIPRNET

(57) ABSTRACT

The motor includes a shaft fixed to a front surface side of a motor bracket; a rotor rotatably supported on the shaft; a stator wound with coils for generating a magnetic field to rotate the rotor; a substrate, a front surface of which mounted with a driver circuit for controlling magnetic field generation by the coils; a conductive driver case forming an accommodation space accommodating the substrate between itself and the motor bracket; a terminal disposed on a front surface side of the substrate facing the motor bracket and connecting the driver circuit and the coils; a conductive fixing member penetrating the substrate from a rear surface side and fixing the terminal in contact with the substrate; and an insulating driver insulator disposed on a rear surface side of the substrate to surround the fixing member, and protruding to a position closer to the driver case than the fixing member.

20 Claims, 7 Drawing Sheets

(56) References Cited

U.S. PATENT DOCUMENTS

| | | | |
|---|---|---|---|
| 2019/0028005 A1* | 1/2019 | Ishizaki | H02K 3/28 |
| 2019/0248406 A1* | 8/2019 | Kaneko | H02K 5/15 |
| 2019/0393753 A1* | 12/2019 | Tsutsui | H02K 9/18 |
| 2020/0195076 A1* | 6/2020 | Naito | H02K 7/145 |
| 2020/0313504 A1* | 10/2020 | Okochi | F04C 29/0085 |
| 2020/0366158 A1* | 11/2020 | Morishita | B62D 5/0403 |
| 2021/0296955 A1* | 9/2021 | Yamada | H02K 3/28 |

* cited by examiner

MOTOR AND FAN DEVICE

CROSS-REFERENCE TO RELATED APPLICATION

This application claims the priority benefits of Japanese application no. 2022-040302, filed on Mar. 15, 2022. The entity of the above-mentioned patent application is hereby incorporated by reference herein and made a part of this specification.

BACKGROUND

Technical Field

The disclosure relates to a motor and a fan device equipped with the motor.

Related Art

A so-called "electromechanical integrated" motor in which a driver circuit for driving the motor is integrated is known. In such a motor, as a cover for preventing the driver circuit from being exposed to water, a metal cover having excellent heat dissipation properties is sometimes employed (see, for example, Patent Literature 1). Moreover, a terminal connecting the driver circuit and coils of the motor may be fixed to the substrate by metal screws (see, for example, Patent Literature 2).

CITATION LIST

Patent Literature

[Patent Literature 1] JP-A-2010-57345
[Patent Literature 2] JP-A-2020-122426

The motor configured as described above is used, for example, as a motor for rotating a cooling fan equipped in an automobile or the like. When the techniques of Patent Literature 1 and Patent Literature 2 are used in combination with a motor used for such applications, there is a problem that the motor cover deformed by an external forces, such as an automobile collision, comes into contact with screws that fix the terminal, causing short-circuiting in the driver circuit.

The disclosure provides a technique for avoiding short-circuiting of a driver circuit even if a metal motor cover is deformed in an electromechanical integrated motor integrated with the driver circuit.

SUMMARY

The disclosure provides a motor, including: a motor bracket; a shaft fixed to a front surface side of the motor bracket; a rotor rotatably supported on the shaft; a stator fixed to the front surface side of the motor bracket inside the rotor and wound with a plurality of coils for generating a magnetic field to rotate the rotor; a substrate, a front surface thereof mounted with a driver circuit for controlling magnetic field generation by the coils; a conductive driver case fixed to a rear surface side of the motor bracket and forming an accommodation space accommodating the substrate between itself and the motor bracket; a terminal disposed on a front surface side of the substrate facing the motor bracket and connecting the driver circuit and the coils; a conductive fixing member penetrating the substrate from a rear surface side and fixing the terminal in contact with the substrate; and an insulating driver insulator disposed on a rear surface side of the substrate to surround the fixing member and protruding to a position closer to the driver case than the fixing member.

DESCRIPTION OF THE EMBODIMENTS

According to the disclosure, in an electromechanical integrated motor integrated with a driver circuit, it is possible to avoid short-circuiting of the driver circuit even if the metal motor cover is deformed. Problems, configurations, and effects other than those described above will be clarified by the following description of the embodiments.

As one aspect of a fan device according to an embodiment of the disclosure, a fan device that is equipped in a vehicle such as an automobile and cools engine cooling water or the like flowing in a radiator will be described below.
(Overall Configuration of Fan Device 1)

Figure 1:
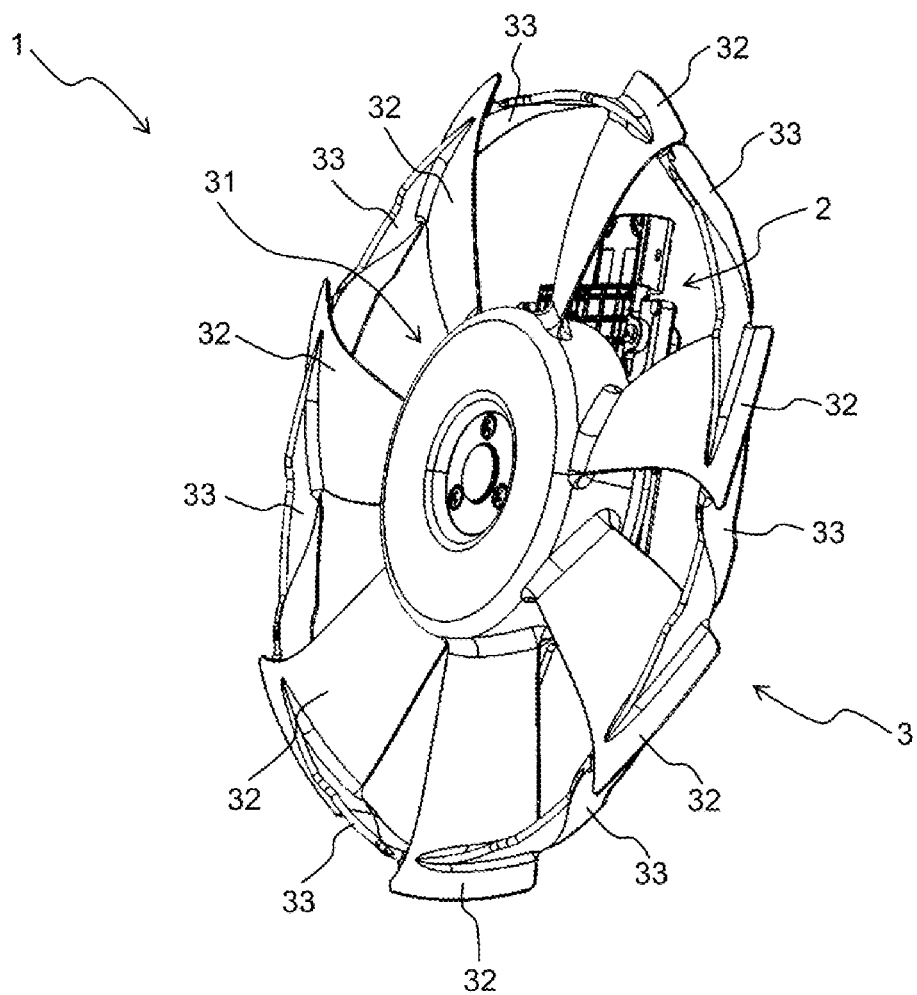
FIG. 1 is an external perspective diagram showing a configuration example of a fan device according to an embodiment.
Figure 2:
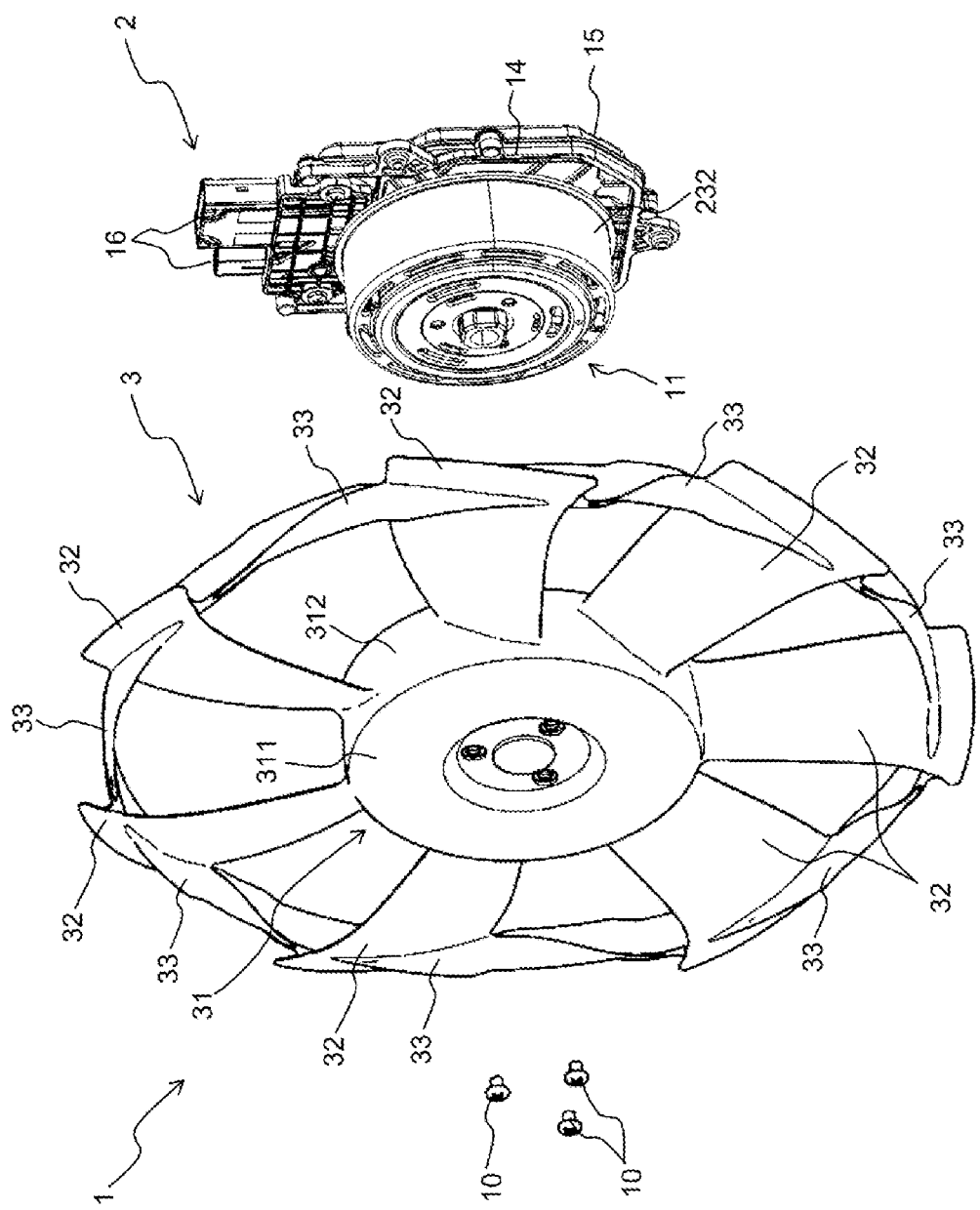
FIG. 2 is an exploded perspective diagram of a motor and a fan.

First, an overall configuration of a fan device 1 will be described with reference to FIGS. 1 and 2. FIG. 1 is an external perspective diagram showing a configuration example of the fan device 1 according to an embodiment. FIG. 2 is an exploded perspective diagram of a motor 2 and a fan 3.

As shown in FIGS. 1 and 2, the fan device 1 includes the motor 2 which is a drive source, and the fan 3 which is rotationally driven by the motor 2 to generate cooling air. The fan device 1 is disposed in an engine room, for example, such that the motor 2 faces an engine and the fan 3 faces a radiator.

The fan 3 is fastened to the motor 2 by a plurality of screws 10. The screws are fastened to a rotor yoke 232 of the motor 2 from a front side of the fan 3 (a side opposite to a side facing the motor 2) through screw holes formed in a boss portion 31 serving as a central portion of the fan 3. It is not always necessary to use the screws 10 as fastening members for fastening the fan 3 to the motor 2. As long as the fan 3 may be fastened to the motor 2, the number of screws and the types of fastening members are not particularly limited.

The fan 3 includes the boss portion 31 that rotates integrally with a rotor 23 around an axial center of a shaft 21, a plurality of (seven in this embodiment) blades 32 that project radially from an outer circumference of the boss portion 31; and a plurality of (seven in this embodiment) connecting members 33 that connect the adjacent blades 32 on a tip side.

The boss portion 31 includes a disk-shaped disk portion 311 and a cylindrical peripheral wall portion 312 protruding from an outer edge of the disk portion 311 toward the motor 2 and having the plurality of blades 32 attached thereto.

When the fan 3 is attached to the motor 2, the disk portion 311 faces a connection wall 232C of the rotor yoke 232 and the peripheral wall portion 312 surrounds the outer circumferential wall 232A of the rotor yoke 232.

(Configuration of Motor 2)

Figure 3:
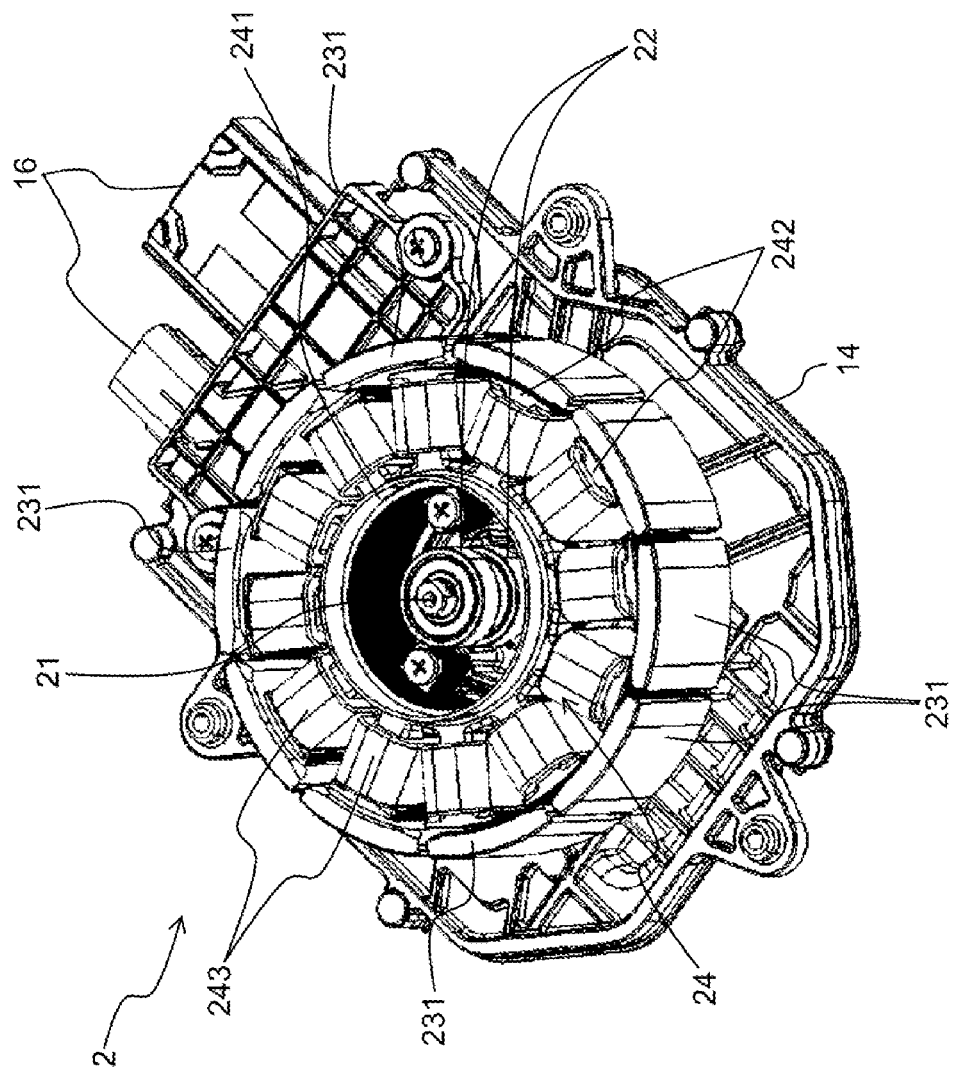
FIG. 3 is a perspective diagram showing a front surface side of a configuration of a motor with a rotor yoke removed.
Figure 4:
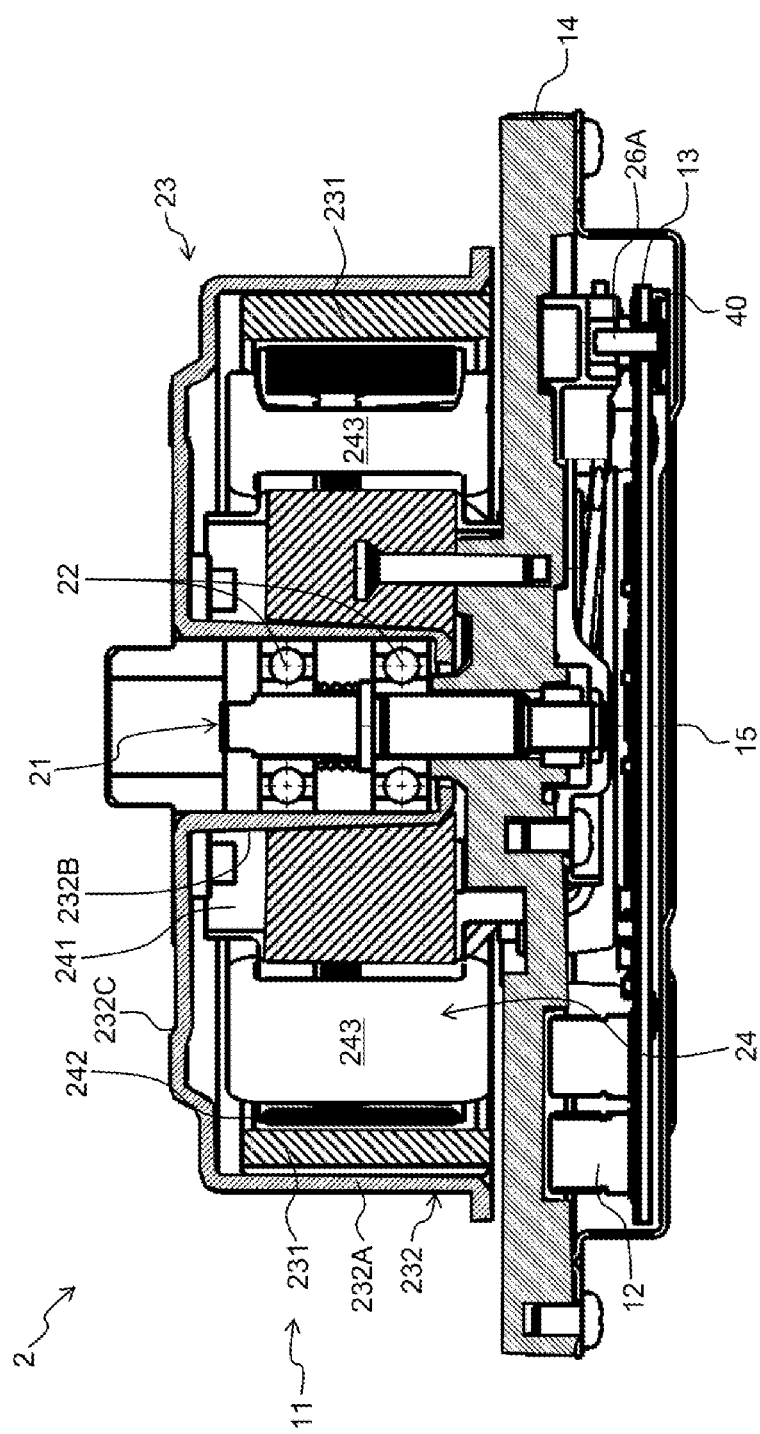
FIG. 4 is a longitudinal sectional diagram of a motor.

Next, the configuration of the motor 2 will be described with reference to FIGS. 3 and 4. FIG. 3 is a perspective diagram showing a front surface side of a configuration of the motor 2 with the rotor yoke 232 removed. FIG. 4 is a longitudinal sectional diagram of the motor 2.

As shown in FIGS. 3 and 4, the motor 2 is a so-called "electromechanical integrated" electric motor including an outer rotor type brushless motor 11 and a substrate 13 on which a driver circuit 12 is mounted.

The brushless motor 11 is supported by a motor bracket 14. The brushless motor 11 is disposed on one side (front surface side) of the motor bracket 14 in a thickness direction. A driver case 15 is fastened to the other side (rear surface side) of the motor bracket 14 in the thickness direction by a plurality of screws. Thereby, an accommodation space for accommodating the substrate 13 is formed between a rear surface of the motor bracket 14 and the driver case 15.

In other words, the substrate 13 is disposed on a side opposite to components 21-24 of the brushless motor 11 (the rear surface side of the motor bracket 14) with the motor bracket 14 interposed therebetween. The driver case 15 is formed of a material (e.g. aluminum, iron, stainless steel, etc.) that is conductive and is not easily deformed and broken when external force is applied.

A connector unit 16 in which two connectors to which an external harness is connected are integrated is attached to an end portion of the motor bracket 14. The brushless motor 11, the driver circuit 12, and the connector unit 16 are electrically connected.

As shown in FIGS. 3 and 4, the brushless motor 11 includes the shaft 21; a plurality of bearings 22 provided on an outer circumference of the shaft 21; the rotor 23 rotatably supported around the axial center of the shaft 21 via the bearings 22; and an annular stator 24 fixed at a predetermined interval from the rotor 23 in a radial direction.

The shaft 21 is a fixed shaft fixed to the front surface side of the motor bracket 14. In the following description of components of the motor 2, an axial direction of the shaft 21 is simply referred to as the "axial direction", the radial direction around the axial center of the shaft 21 is simply referred to as the "radial direction", and a circumferential direction around the axial center of the shaft 21 is simply referred to as the "circumferential direction".

As shown in FIG. 4, the rotor 23 includes a plurality of permanent magnets 231 disposed at equal intervals in the circumferential direction so as to surround an outer circumference of the stator 24, and the rotor yoke 232 that supports the plurality of permanent magnets 231 and is rotatably supported on the shaft 21.

The rotor yoke 232 is disposed on the front surface side of the motor bracket 14 so as to be concentric with the axial center of the shaft 21. Moreover, the rotor yoke 232 is rotatably supported by the shaft 21 via the plurality of bearings 22. Furthermore, the rotor yoke 232 includes an outer circumferential wall 232A, an inner circumferential wall 232B, and the connection wall 232C.

The outer circumferential wall 232A has a cylindrical outer shape. Moreover, the outer circumferential wall 232A is disposed outward of the stator 24 in the radial direction. Further, the outer circumferential wall 232A supports the plurality of permanent magnets 231 with an inner circumferential surface. In other words, the plurality of permanent magnets 231 are fixed to an inner circumferential surface of the outer circumferential wall 232A at predetermined intervals in the circumferential direction.

The inner circumferential wall 232B has a cylindrical outer shape. Moreover, the inner circumferential wall 232B is disposed inward of the stator 24 in the radial direction. Further, the inner circumferential wall 232B is rotatably supported by the shaft 21 via the plurality of bearings 22.

The connection wall 232C has a disk-shaped outer shape. Moreover, the connection wall 232C connects axial ends of the outer circumferential wall 232A and the inner circumferential wall 232B. Furthermore, the connection wall 232C is disposed on a side opposite to the motor bracket 14 with the stator 24 interposed therebetween. The connection wall 232C is disposed opposite to the stator 24 with a predetermined interval in the axial direction.

The stator 24 is accommodated in a space surrounded by the outer circumferential wall 232A, the inner circumferential wall 232B, the connection wall 232C, and a front surface of the motor bracket 14. Moreover, the stator 24 is fixed to the front surface side of the motor bracket 14 inward of the plurality of permanent magnets 231 in the radial direction. Furthermore, the stator 24 faces the plurality of permanent magnets 231 with a predetermined gap in the radial direction.

The stator 24 includes a cylindrical stator core 241, a stator insulator 242 mounted on both sides in the axial direction of a plurality of teeth projecting outward in the radial direction from the stator core 241; and conductive coils 243 wound on the stator insulator 242.

The stator 24 generates a magnetic field when a current flows through the coils 243. The rotor yoke 232 rotates around the axial center of the shaft 21 due to the magnetic field generated by the coils 243 and the attractive force and repulsive force generated between the plurality of permanent magnets 231.

The driver circuit 12 controls generation of the magnetic field by the plurality of coils 243. The driver circuit 12 is composed of a plurality of electronic components (e.g. transistor, diode, resistor, etc.) surface-mounted on a front surface of the substrate 13 facing the motor bracket 14. Moreover, the electronic components that make up the driver circuit 12 are not disposed on a rear surface side of the substrate 13 that faces the driver case 15.

Figure 5:
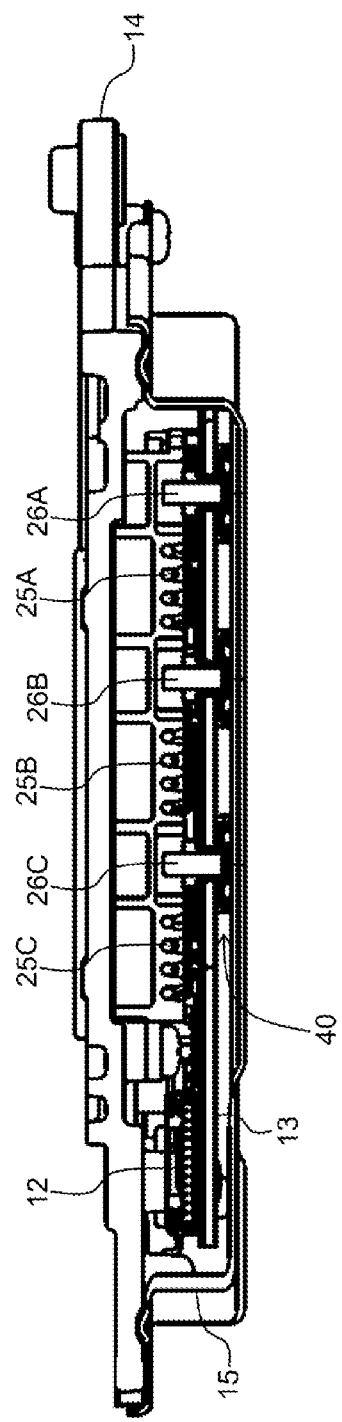
FIG. 5 is a longitudinal sectional diagram of a motor bracket and a driver case at a position of a driver insulator.
Figure 6:
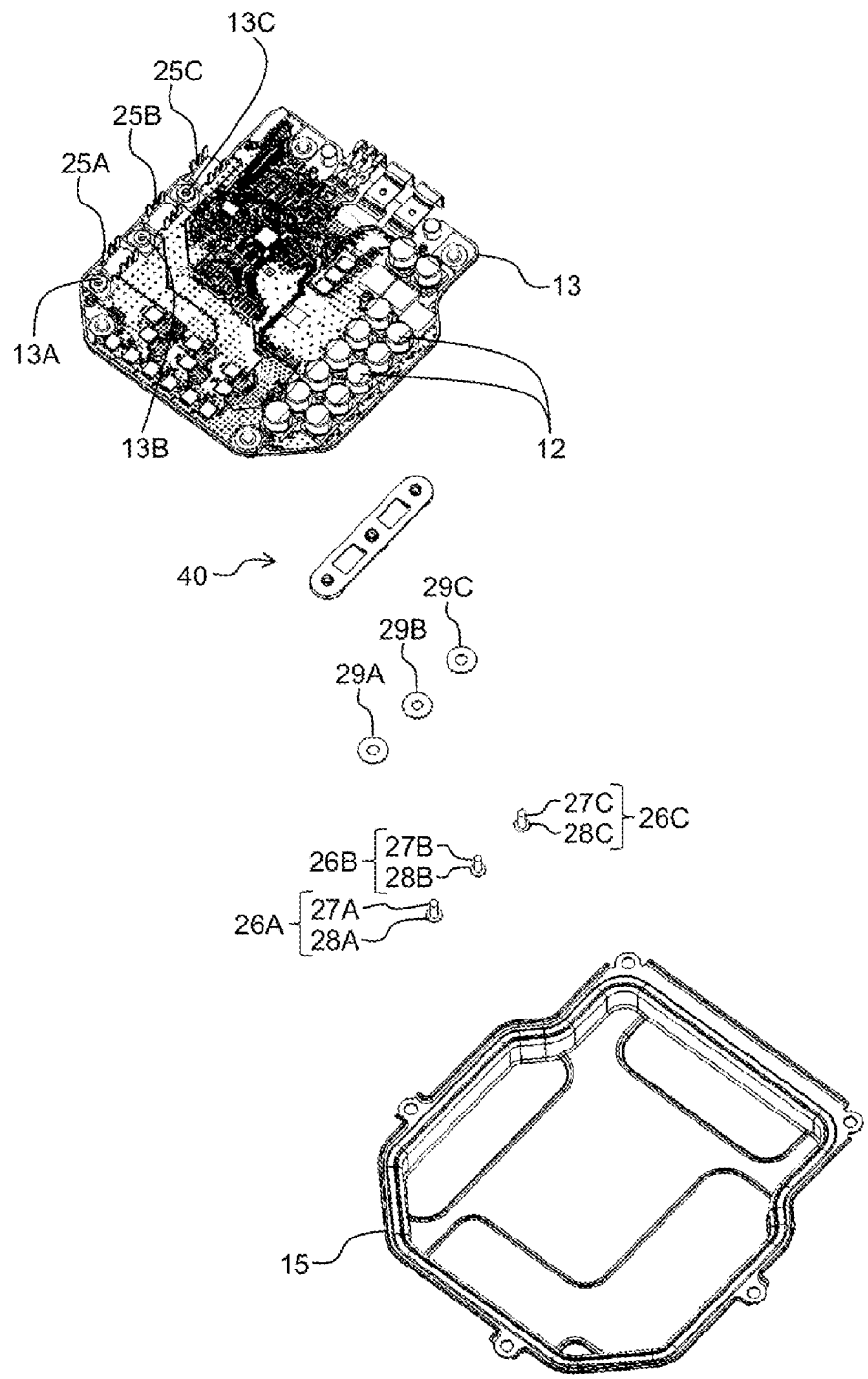
FIG. 6 is an exploded perspective diagram of components disposed on a rear surface side of a motor bracket.
(A) and (B) of FIG. 7 are perspective diagrams of a driver insulator.

FIG. 5 is a longitudinal sectional diagram of the motor bracket 14 and the driver case at the position of a driver insulator 40. FIG. 6 is an exploded perspective diagram of components disposed on the rear surface side of the motor bracket 14.

As shown in FIGS. 5 and 6, terminals 25A, 25B, 25C are attached to the front surface of the substrate 13. The terminals 25A, 25B, 25C electrically connect the driver circuit 12 and the coils 243. The brushless motor 11 has the three terminals 25A, 25B, 25C so as to supply three-phase (U-phase, V-phase, W-phase) power to the plurality of coils 243. In other words, the brushless motor 11 is a three-phase AC motor.

As shown in FIG. 5, the terminals 25A, 25B, 25C are fixed in contact with the substrate 13 by screws 26A, 26B and 26C. As shown in FIG. 6, the screws 26A, 26B, and 26C include columnar shank portions 27A, 27B, and 27C having male screws formed on an outer circumferential surface, and head portions 28A, 28B, and 28C provided on base end sides of the shank portions 27A, 27B, and 27C.

Moreover, by inserting the shank portions 27A, 27B, and 27C from the rear surface side of the substrate 13 into through holes 13A, 13B, and 13C penetrating the substrate 13 in the thickness direction, and screwing nuts with the terminals 25A, 25B, 25C sandwiched on the front surface side of the substrate 13, the terminals 25A, 25B, 25C are fixed to the substrate 13. On the other hand, the head portions 28A, 28B, and 28C protrude from the rear surface of the substrate 13 toward the driver case 15 side. The screws 26A, 26B, and 26C are made of a conductive material such as metal.

Further, washers 29A, 29B, 29C and the driver insulator 40 are interposed between the rear surface of the substrate 13 and the head portions 28A, 28B, 28C. The washers 29A, 29B, 29C are ring-shaped members made of metal, and are disposed between the substrate 13 and the head portions 28A, 28B, 28C to prevent the screws 26A, 26B, 26C from loosening. The screws 26A, 26B, 26C, the washers 29A, 29B, 29C, and the nuts (not shown) are examples of a conductive fixing member that makes the terminals 25A, 25B, 25C contact and fixed to the substrate 13. However, the combination of the components of the fixing member is not limited to the above examples.

(Configuration of Driver Insulator 40)

Figure 7:
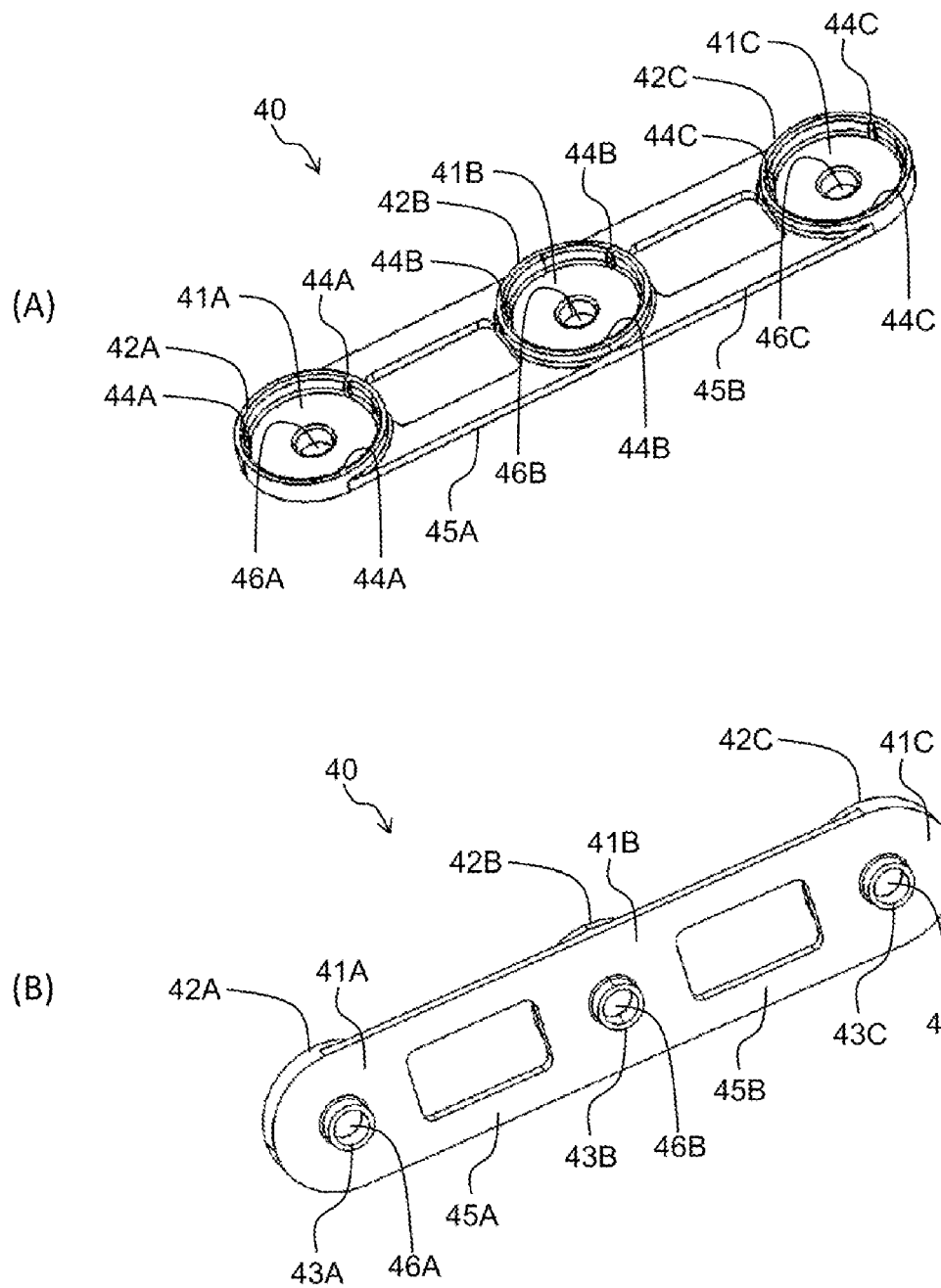

(A) and (B) of FIG. 7 are perspective diagrams of the driver insulator 40. The driver insulator 40 according to this embodiment includes bottom walls 41A, 41B, 41C; peripheral walls 42A, 42B, 42C; bosses 43A, 43B, 43C; claws 44A, 44B, 44C; and bridges 45A, 45B. The driver insulator 40 is made of an insulating material (e.g. resin).

The driver insulator 40 includes three sets of the bottom wall: 41A, 41B, 41C; the peripheral wall: 42A, 42B, 42C; the boss: 43A, 43B, 43C; and the claw: 44A, 44B, 44C, corresponding to the three terminals 25A, 25B, 25C respectively. Since the components of each set are common, the bottom wall 41A, the peripheral wall 42A, the boss 43A, and the claw 44A will be described below.

The bottom wall 41A has a disk-shaped outer shape corresponding to a shape of the washer 29A. An opening 46A penetrating in the thickness direction is formed in a center of the bottom wall 41A. A diameter of the opening 46A is larger than a diameter of the shank portion 27A of the screw 26A and smaller than a diameter of the head portion 28A. In other words, the shank portion 27A may pass through the opening 46A, and the head portion 28A cannot pass through the opening 46A.

The peripheral wall 42A is disposed so as to surround the opening 46A on one side (the driver case 15 side) of the bottom wall 41A in the thickness direction. The peripheral wall 42A has a cylindrical outer shape. More specifically, the peripheral wall 42A protrudes from the bottom wall 41A and continues in the circumferential direction. Moreover, a protrusion amount of the peripheral wall 42A is higher than a height of the head portion 28A. In other words, when the screw 26A and the driver insulator 40 are attached to the rear surface of the substrate 13, a tip of the peripheral wall 42A is disposed closer to the driver case 15 than the head portion 28A of the screw 26A. Furthermore, an inner diameter dimension of the peripheral wall 42A is the same as or slightly larger than an outer dimension of the washer 29A.

The boss 43A is formed so as to surround the opening 46A on the other side (the substrate 13 side) of the bottom wall 41A in the thickness direction. In other words, the boss 43A protrudes from the bottom wall 41A in an opposite direction to the peripheral wall 42A. The boss 43A has a cylindrical outer shape. An inner diameter dimension of the boss 43A is slightly larger than a diameter of the shank portion 27A. Moreover, an outer dimension of the boss 43A is slightly smaller than a diameter of the through hole 13A formed in the substrate 13. Furthermore, a protrusion amount of the boss 43A is smaller than a thickness dimension of the substrate 13.

The claws 44A are formed at predetermined intervals (e.g. 120°) at a plurality of positions (e.g. three positions) spaced apart in the circumferential direction of the peripheral wall 42A. Further, the claw 44A protrudes inward in the radial direction from an inner circumferential surface of the peripheral wall 42A. The diameter of virtual circle connecting tips of the plurality of claws 44A is slightly smaller than the outer dimension of the washer 29A. Further, the claw 44A is formed with an axial gap from the bottom wall 41A. The gap between the bottom wall 41A and the claw 44A is slightly larger than the thickness of the washer 29A.

The bridge 45A connects the adjacent peripheral walls 42A and 42B. Similarly, the bridge 45B connects the adjacent peripheral walls 42B, 42C. Thereby, the components of the driver insulator 40 are integrated. In this embodiment, an example in which the three peripheral walls 42A, 42B, 42C are linearly connected are described, but the positions of the three peripheral walls 42A, 42B, 42C may be appropriately changed according to the layout of the terminals 25A, 25B, 25C.

(Assembly Procedure for Motor 2)

Next, a procedure for assembling the substrate 13, the driver case 15, the terminals 25A-25C, the screws 26A-26C, the washers 29A-29C, and the driver insulator 40 will be described.

First, the terminals 25A-25C are attached to the front surface of the substrate 13. Thereby, the terminals 25A-25C are electrically connected to the driver circuit 12. Moreover, the washers 29A-29C are fitted into inner sides the peripheral walls 42A-42C so as to pass over the claws 44A-44C. Thereby, the washers 29A-29C are held between the bottom walls 41A-41C and the claws 44A-44C.

Next, the bosses 43A-43C are inserted into the through holes 13A-13C from the rear surface side of the substrate 13. Thereby, surfaces of the bottom walls 41A-41C on which the bosses 43A-43C are formed come into contact with the rear surface of the substrate 13. Moreover, openings of the washers 29A-29C, openings 46A-46C of the bottom walls 41A-41C, internal spaces of the bosses 43A-43C, and the through holes 13A-13C of the substrate 13 communicate with each other.

Next, the screws 26A-26C are inserted into the through holes 13A-13C from the rear surface side of the substrate 13. More specifically, tips of the shank portions 27A-27C are inserted into the openings of the washers 29A-29C, the openings 46A-46C of the bottom walls 41A-41C, the internal spaces of the bosses 43A-43C, and the through holes 13A-13C of the substrate 13. Then, on the front surface side of the substrate 13, the screws 26A-26C and the nuts are screwed together with the terminals 25A-25C interposed therebetween. Thereby, the terminals 25A-25C are fixed in contact with the front surface of the substrate 13.

Next, the terminals 25A-25C are electrically connected to the coils 243. Furthermore, the motor bracket 14 and the driver case 15 are joined with the substrate 13 interposed therebetween. Thereby, the substrate 13 is accommodated in the accommodation space.

According to the embodiment, for example, the following effects are achieved.

According to the embodiment, by surrounding the head portions 28A-28C with the peripheral walls 42A-42C that protrude to a position closer to the driver case 15 from the head portions 28A-28C, even if the driver case 15 is deformed toward the substrate 13 by an external force, the driver case 15 hits the peripheral walls 42A-42C before the head portions 28A-28C. Thereby, the driver case 15 is prevented from coming into contact with the head portions 28A-28C and short-circuiting the driver circuit 12.

Moreover, in this embodiment, an example in which the head portions 28A-28C are surrounded by the peripheral walls 42A-42C that are continuous in the circumferential direction has been described, the configuration of the driver insulator 40 for preventing contact between the driver case 15 and the head portions 28A-28C is not limited to thereto. As another example, the driver insulator 40 may have a plurality of projections disposed at predetermined intervals in the circumferential direction at a position surrounding the head portions 28A-28C. Further, the plurality of protrusions need only protrude to a position closer to the driver case 15 than the head portions 28A-28C.

Further, of the components of the fixing member for fixing the terminals 25A-25C to the substrate 13, those closest to the driver case 15 are not limited to the head portions 28A-28C of the screws 26A-26C. In other words, the peripheral walls 42A-42C need only protrude to a position further closer to the driver case 15 than the portions (e.g. the washers 29A-29C) disposed closest to the driver case 15 among the components of the fixing member.

Further, according to the embodiment, by providing the claws 44A-44C for holding the washers 29A-29C, the driver insulator 40 with the washers 29A-29C attached may be assembled to the substrate 13. Thereby, the work of assembling the driver insulator 40 to the substrate 13 is facilitated. However, the claws 44A to 44C may be omitted.

Further, according to the embodiment, by providing the bosses 43A-43C inserted into the through holes 13A-13C of the substrate 13, the driver insulator 40 may be easily positioned with respect to the substrate 13. However, the bosses 43A-43C may be omitted.

Further, according to the embodiment, by connecting the plurality of the peripheral walls 42A-42C with the bridges 45A and 45B, the components of the driver insulator 40 are integrated. Thereby, the work of assembling the driver insulator 40 to the substrate 13 is further facilitated. However, the three sets of the bottom wall: 41A-41C and the peripheral wall: 42A-42C may be made independent by omitting the bridges 45A and 45B.

The driver insulator 40 according to this embodiment helps prevent contact between the driver case 15 and the screws 26A-26C when an amount of deformation of the driver case 15 is relatively small. However, if the driver case 15 is largely deformed, there is a possibility that the driver circuit 12 will be short-circuited due to contact between the driver case 15 and the screws 26A-26C.

Thus, the driver circuit 12 according to this embodiment may include an output circuit (e.g. a circuit composed of six transistors) that outputs power to the coils 243, and a so-called "Circuit Open Failure detection circuit" that detects that an overcurrent has flowed to the output circuit and stops the supply of power to the output circuit. Thereby, even if the driver case 15 is largely deformed to such an extent that the possibility of short-circuiting of the driver circuit 12 cannot be avoided by the driver insulator 40 alone, it is possible to prevent overcurrent from continuing to flow through the driver circuit 12. In addition, since the configuration of the Circuit Open Failure detection circuit is already well known, detailed description thereof will be omitted.

In the embodiment, an example in which the fan device 1 is equipped in a vehicle driven by an engine has been described, but the fan device 1 may be equipped in a vehicle driven by a motor, storage battery, fuel cell, or the like. Also, as an application of the fan device 1, an example of supplying cooling air to a radiator has been described, but the application of the fan device 1 is not limited thereto. Furthermore, in the embodiment, as an application of the motor 2, an example of a fan motor that rotationally drives the fan 3 has been described, but the application of the motor 2 is not limited thereto.

The embodiments of the disclosure have been described above. Moreover, the disclosure is not limited to the above embodiments, and includes various modifications. For example, the above embodiments have been described in detail in order to explain the disclosure in an easy-to-understand manner, and are not necessarily limited to having all the configurations described. Further, a part of the configuration of the embodiments may be replaced with the configuration of another embodiment, and it is also possible to add the configuration of another embodiment to the configuration of the embodiments. Furthermore, it is possible to add, delete, or replace a part of the configuration of the embodiments with another configuration.

What is claimed is:

1. A motor, comprising:
    a motor bracket;
    a shaft fixed to a front surface side of the motor bracket;
    a rotor rotatably supported on the shaft;
    a stator fixed to the front surface side of the motor bracket inside the rotor and wound with a plurality of coils for generating a magnetic field to rotate the rotor;
    a substrate, a front surface thereof mounted with a driver circuit for controlling magnetic field generation by the coils;
    a conductive driver case fixed to a rear surface side of the motor bracket and forming an accommodation space accommodating the substrate between itself and the motor bracket,
    a terminal disposed on a front surface side of the substrate facing the motor bracket and connecting the driver circuit and the coils;
    a conductive fixing member penetrating the substrate from a rear surface side and fixing the terminal in contact with the substrate; and
    an insulating driver insulator disposed on a rear surface side of the substrate to surround the fixing member and protruding to a position closer to the driver case than the fixing member.

2. The motor according to claim 1,
    wherein the fixing member comprises a screw having a head portion and a shank portion; and
    the driver insulator comprises:
        a bottom wall forming an opening into which the shank portion enters and contacting a rear surface of the substrate; and
        a peripheral wall protruding from the bottom wall toward the driver case at a position surrounding the opening and continuous in a circumferential direction.

3. The motor according to claim 2,
    wherein the fixing member comprises a ring-shaped washer interposed between the head portion and the bottom wall; and
    the driver insulator comprises a plurality of claws formed at positions spaced apart in a circumferential direction on an inner circumferential surface of the peripheral wall and holding the washer between themselves and the bottom wall.

4. The motor according to claim 3,
wherein the driver insulator comprises a boss protruding from the bottom wall in a direction opposite to the peripheral wall at the position surrounding the opening and entering a through hole penetrating through the substrate in a thickness direction.

5. A fan device, comprising:
the motor according to claim 4; and
a fan rotationally driven by the motor to generate cooling air.

6. The motor according to claim 3, comprising:
three of the terminals supplying three-phase power to the plurality of coils;
wherein the driver insulator comprises:
three sets of the bottom wall and the peripheral wall corresponding to the three terminals respectively; and
a bridge connecting the adjacent peripheral walls.

7. A fan device, comprising:
the motor according to claim 6; and
a fan rotationally driven by the motor to generate cooling air.

8. The motor according to claim 3,
wherein the driver circuit detects that an overcurrent has flowed to an output circuit that outputs power to the coils, and stops supply of the power to the output circuit.

9. A fan device, comprising:
the motor according to claim 8; and
a fan rotationally driven by the motor to generate cooling air.

10. A fan device, comprising:
the motor according to claim 3; and
a fan rotationally driven by the motor to generate cooling air.

11. The motor according to claim 2,
wherein the driver insulator comprises a boss protruding from the bottom wall in a direction opposite to the peripheral wall at the position surrounding the opening and entering a through hole penetrating through the substrate in a thickness direction.

12. A fan device, comprising:
the motor according to claim 11; and
a fan rotationally driven by the motor to generate cooling air.

13. The motor according to claim 2, comprising:
three of the terminals supplying three-phase power to the plurality of coils;
wherein the driver insulator comprises:
three sets of the bottom wall and the peripheral wall corresponding to the three terminals respectively; and
a bridge connecting the adjacent peripheral walls.

14. A fan device, comprising:
the motor according to claim 13; and
a fan rotationally driven by the motor to generate cooling air.

15. The motor according to claim 2,
wherein the driver circuit detects that an overcurrent has flowed to an output circuit that outputs power to the coils, and stops supply of the power to the output circuit.

16. A fan device, comprising:
the motor according to claim 15; and
a fan rotationally driven by the motor to generate cooling air.

17. A fan device, comprising:
the motor according to claim 2; and
a fan rotationally driven by the motor to generate cooling air.

18. The motor according to claim 1,
wherein the driver circuit detects that an overcurrent has flowed to an output circuit that outputs power to the coils, and stops supply of the power to the output circuit.

19. A fan device, comprising:
the motor according to claim 18; and
a fan rotationally driven by the motor to generate cooling air.

20. A fan device, comprising:
the motor according to claim 1; and
a fan rotationally driven by the motor to generate cooling air.

* * * * *